Aug. 4, 1931.        W. H. BAHAN        1,817,336
LOOM TEMPLE
Filed Nov. 13, 1929

Inventor
W. H. Bahan.
By Lacey & Lacey,
Attorneys

Patented Aug. 4, 1931

1,817,336

UNITED STATES PATENT OFFICE

WILLIAM H. BAHAN, OF GREENVILLE, SOUTH CAROLINA

LOOM TEMPLE

Application filed November 13, 1929. Serial No. 406,926.

This invention relates to loom temples and has for its object the provision of a very simple means whereby wear upon the shank may be taken up and the proper tension upon the cloth maintained. The invention is illustrated in the accompanying drawings and consists in certain novel features which will be particularly defined in the appended claim.

Figure 1:
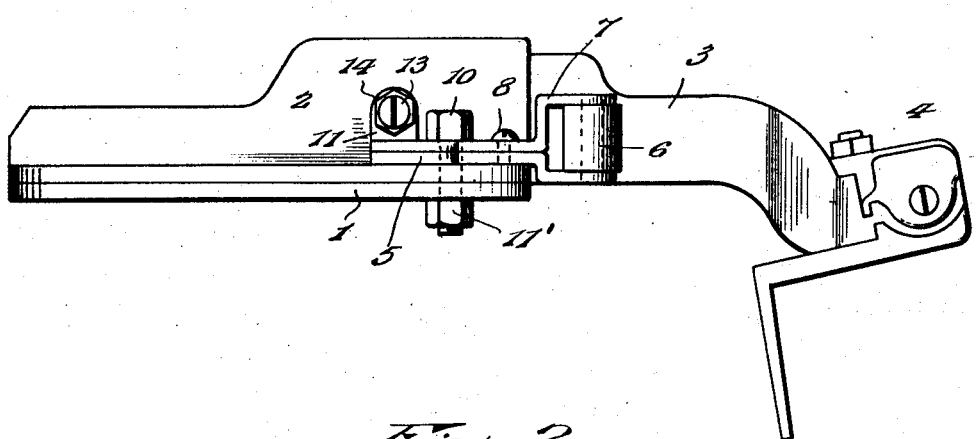
Figure 1 is a side elevation of a loom temple embodying the invention.
Figure 2:
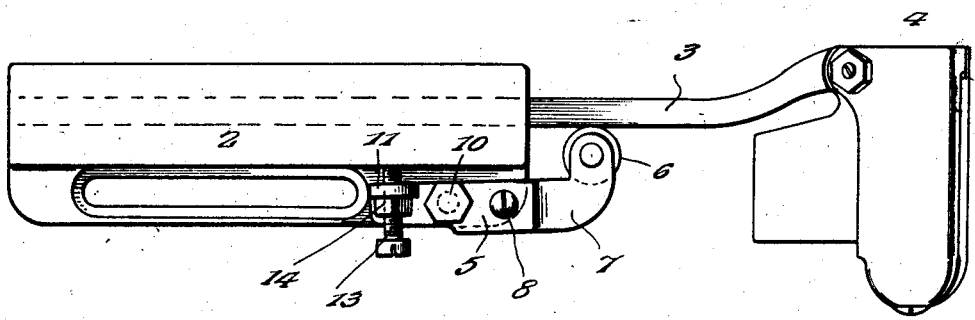
Fig. 2 is a top plan view of the same.
Figure 3:
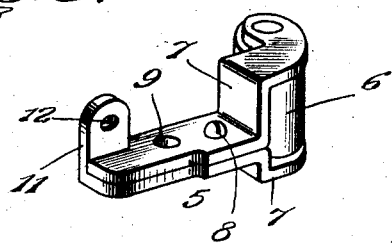
Fig. 3 is a detail perspective view of the wear compensator.

It is well known that as the shank of a loom temple oscillates or reciprocates during the operation of the loom there is considerable wear upon the shank so that eventually it becomes loose and fails to hold the cloth with that even tension which is highly desirable and heretofore it has been necessary to replace the temple when it has been in use for a short period. The present invention provides means whereby the shank may be held true notwithstanding wear and may be adjusted to take up the wear without requiring stoppage of the loom or replacement of any parts. In the accompanying drawings, the reference numeral 1 indicates the usual stand and 2 the cap in which the shank 3 is fitted and spring pressed to its work, the usual trough and roller, indicated at 4, being carried by the outer end of the shank. According to the present invention, a lever or rocking arm 5 is pivotally mounted upon the flange of the cap and is so disposed that one end projects beyond the cap and may press against the side of the shank, said end being equipped with a roller 6 which rides on the shank to minimize friction. The lever, as shown clearly in the drawing, is formed of two short lengths of flat bar metal having offset portions 7 at one end whereby to form a fork carrying the roller 6, as shown. The two lengths of bar metal are secured together by a screw or similar fastening 8 inserted therethrough between their ends and they are provided with an opening 9 through which a bolt 10 may be inserted, said bolt passing through the flanges of the cap and the stand so as to secure the lever or rocking arm in place. The bolt is equipped with a nut 11' on its lower end which is turned home against the bottom of the stand and it has a sufficiently loose fit in the lever to permit the same to rock freely. The inner end of one member of the lever is formed with an upstanding lug 11 having a threaded opening 12 therethrough at or near its upper end. A set bolt 13 is engaged in the threaded opening 12 and bears against the side of the cap, as shown clearly in Fig. 2, a lock nut 14 being mounted upon the bolt and turned home against the lug 11 to hold the bolt in an adjusted position.

The use of the device will, it is thought, be readily understood from the foregoing description, taken in connection with the accompanying drawings. The set bolt 13, by bearing against the side of the cap, will hold the outer end of the lever or rocking arm toward the shank of the temple and the roller 6 bearing upon the side of the shank will, consequently, hold the shank to a true rectilinear path and minimize the wear. As the shank wears, the lock nut 14 may be slightly loosened and the set bolt 13 then turned home against the side of the cap so that the free end of the lever or rocking arm carrying the roller will follow up the shank and hold it in the desired operative position thereby compensating for wear and prolonging the useful life of the device. The compensator is exceedingly simple and may be applied to any temple at a very slight cost. Its form is such that it does not interfere with the operation of the loom in any way and it may be produced at such a low cost as to permit its installation and use on a very wide scale.

Having thus described the invention, I claim:

A wear take up and lost motion adjuster for loom temples consisting of a lever comprising juxtaposed complemental members having corresponding ends extending outwardly in opposite directions, thence longitudinally in parallel relation and again laterally in the same direction, and having a lug adjacent the opposite end and side of a member and accommodated in a cut away portion of the companion member, said lug having a threaded opening to receive an adjusting screw, both members having registering openings, the one receiving a fastening to connect the members and the other adapted to receive a pivot upon which the lever is mounted, and a roller mounted between the spaced terminals of the members to engage a side of the temple shank.

In testimony whereof I affix my signature.

WILLIAM H. BAHAN. [L. S.]